(12) United States Patent
Peterson et al.

(10) Patent No.: US 9,404,599 B2
(45) Date of Patent: Aug. 2, 2016

(54) DUAL/VARIABLE GAIN OIL PUMP CONTROL VALVE

(71) Applicant: FLEXTRONICS AUTOMOTIVE INC., Milpitas, CA (US)

(72) Inventors: Matthew Peterson, Ada, MI (US); Hamid Najmolhoda, Grand Rapids, MI (US)

(73) Assignee: Flextronics Automotive Inc., San Jose, CA (US)

( * ) Notice: Subject to any disclaimer, the term of this patent is extended or adjusted under 35 U.S.C. 154(b) by 122 days.

(21) Appl. No.: 14/206,442

(22) Filed: Mar. 12, 2014

(65) Prior Publication Data
US 2015/0260302 A1    Sep. 17, 2015

(51) Int. Cl.
| | |
|---|---|
| *F16K 11/07* | (2006.01) |
| *F16K 31/06* | (2006.01) |
| *F16K 15/18* | (2006.01) |
| *F16K 31/42* | (2006.01) |
| *F15B 13/043* | (2006.01) |

(52) U.S. Cl.
CPC .......... *F16K 31/0613* (2013.01); *F16K 11/0716* (2013.01); *F16K 15/18* (2013.01); *F16K 31/426* (2013.01); *F15B 13/0433* (2013.01); *Y10T 137/8671* (2015.04)

(58) Field of Classification Search
CPC .................................................. F15B 13/0433
USPC ............................. 137/625.63, 625.64, 625.69
See application file for complete search history.

(56) References Cited

U.S. PATENT DOCUMENTS

| | | | | |
|---|---|---|---|---|
| 3,722,547 | A * | 3/1973 | Kirstein | F15B 13/0402 137/625.63 |
| 3,736,958 | A * | 6/1973 | Rostad | F16K 11/07 137/625.6 |
| 3,824,898 | A * | 7/1974 | Pauliukonis | F15B 11/064 91/416 |
| 4,150,695 | A | 4/1979 | Kosugui | |
| 4,199,942 | A * | 4/1980 | Kasper | E02F 9/2232 60/420 |
| 4,245,671 | A * | 1/1981 | Kosugui | F15B 13/0431 137/625.6 |
| 4,526,201 | A * | 7/1985 | Geyler, Jr. | F15B 13/0403 137/625.63 |
| 4,538,643 | A * | 9/1985 | Goedecke | F15B 13/0438 137/625.64 |
| 6,343,621 | B1 | 2/2002 | Holmes | |
| 2008/0258090 | A1 | 10/2008 | Najmolhoda | |
| 2009/0090882 | A1 | 4/2009 | Reilly | |

* cited by examiner

*Primary Examiner* — John Fox
(74) *Attorney, Agent, or Firm* — Volpe and Koenig, P.C.

(57) ABSTRACT

A solenoid fluid control valve is disclosed for controlling a variable displacement pump. The solenoid fluid control valve comprises a fixed solenoid component, a movable armature component, a fixed nozzle body, a movable spool within the fixed nozzle body, and a valve member. The valve member regulates fluid pressure in a first and second feedback chamber. Fluid in the second feedback chamber establishes a second feedback pressure that acts on the movable spool with a motive feedback force in a first axial direction. The movable spool moves in the first axial direction in response to the motive feedback force.

19 Claims, 8 Drawing Sheets

FIG. 8

DUAL/VARIABLE GAIN OIL PUMP CONTROL VALVE

FIELD OF INVENTION

The present invention relates to an electromagnetic solenoid actuator having an armature mechanism that drives a fluid control element.

BACKGROUND

Direct acting solenoid actuators are often used to control fluid pressure in a variety of systems, including clutch mechanisms and other devices in an automobile. Direct acting solenoid actuators employ an armature mechanism that drives a fluid control element, such as a spool, a spring-biased four-way proportional flow control valve, a poppet valve, and the like in various hydraulic control applications. Typically, the armature is connected to, and drives, a push pin that engages the fluid control element to this end.

The fluid control element may comprise a spool surrounded by a valve body. The spool may be connected to the push pin such that any motion of the armature results in motion of the spool. The position of the spool, and the resulting fluid pressure, are directly dependent on the position of the armature. The coil, therefore, must produce a sufficiently strong magnetic field to move the spool under any pressure condition. To achieve this, the coil may require many loops, dictating the size of the apparatus and requiring a large quantity of copper wiring.

SUMMARY

A solenoid fluid control valve is disclosed for controlling a variable displacement pump. The solenoid fluid control valve comprises a fixed solenoid component, a movable armature component, a fixed nozzle body, a movable spool within the fixed nozzle body, and a valve member. The valve member regulates fluid pressure in a first and second feedback chamber. Fluid in the second feedback chamber establishes a second feedback pressure that acts on the movable spool with a motive feedback force in a first axial direction. The movable spool moves in the first axial direction in response to the motive feedback force.

DETAILED DESCRIPTION OF THE PREFERRED EMBODIMENT(S)

Figure 1:
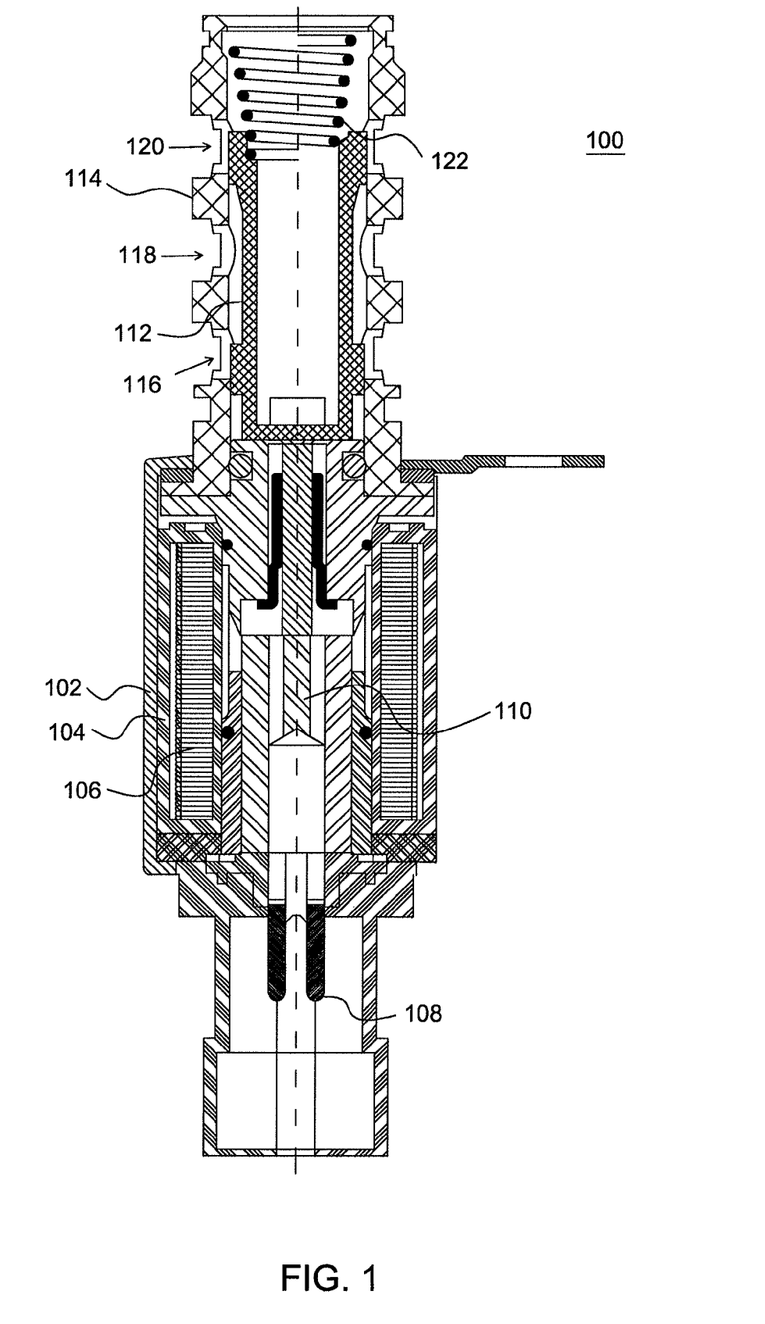
FIG. 1 shows a direct acting solenoid fluid control valve.

A direct acting solenoid fluid control valve is shown in FIG. 1. The direct acting solenoid fluid control valve 100 comprises a housing 102 containing a bobbin 104, and a coil of wire 106 wound on the bobbin 104 and connected to electrical terminals 108. An armature 110 moves in response to a current through the coil 106. The reduced diameter end of the armature 110 is fixed to the adjacent end of a spool 112. A nozzle body 114 includes a supply port 116; a control port 118; and an exhaust port 120. The spool 112 is moved in response to movement of the armature 110 to regulate pressure or flow at the control port 118. The spool 112, and thus the armature 110, is biased by a spring mechanism 122.

For an initially high pressure solenoid fluid control valve, the control port 118 is open to the supply port 116, as shown in FIG. 1. Supplying power to the coil 106 causes the armature 110 to move in the direction of the spring mechanism 122, displacing the spool 112 and connecting the control port 118 to the exhaust port 120, thereby reducing the pressure at the control port. The pressure at the control port 118 therefore directly depends upon the position of the spool 112, and accordingly, the position of the armature 110. The force on the armature 110 induced by the current through the coil 106 must be sufficiently strong to displace the spool and compress the spring mechanism 122. For a large spool, this may require many turns of the coil 106, contributing to the device's size, weight, and cost.

Figure 2:
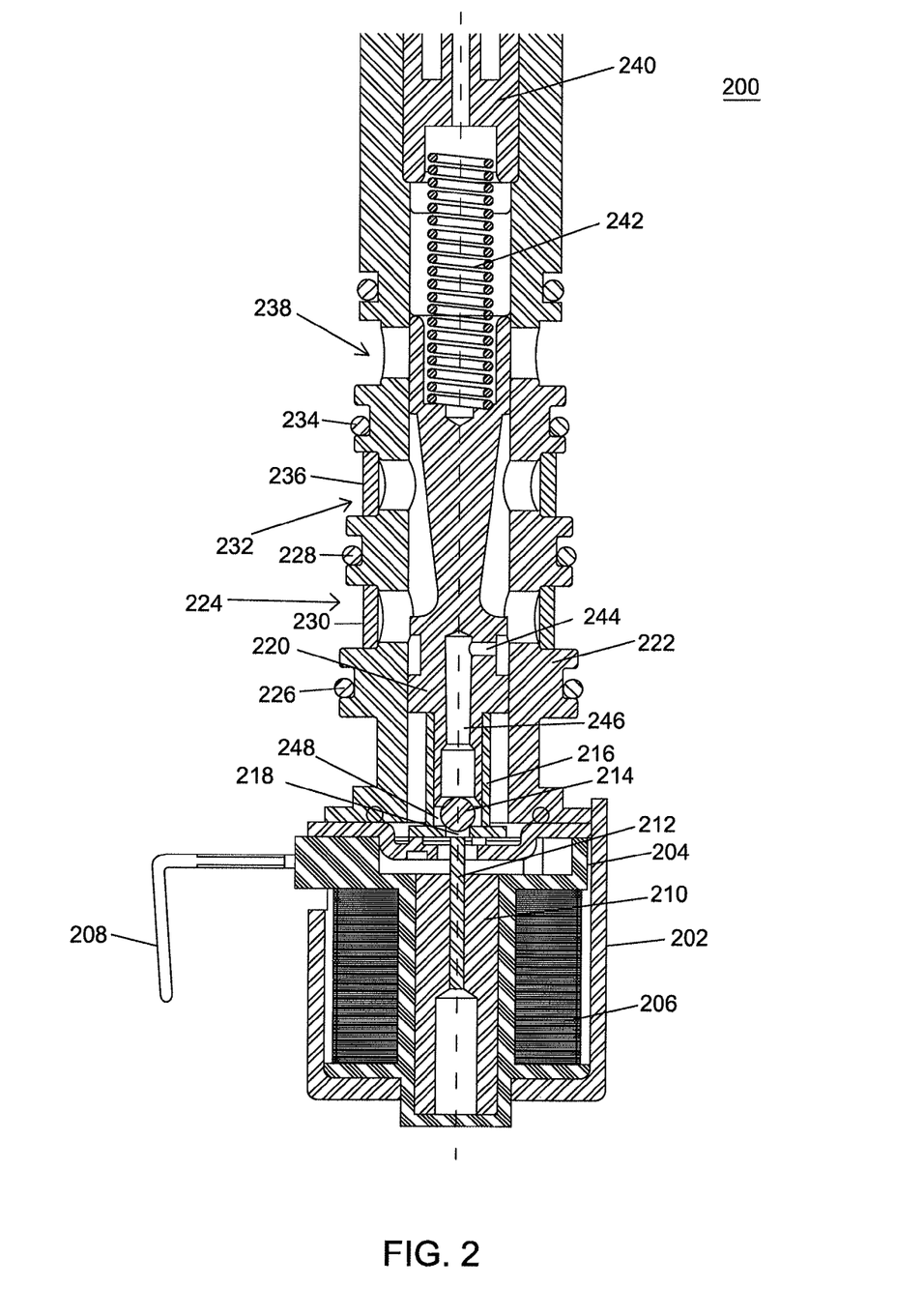
FIG. 2 shows a dual gain solenoid fluid control valve in a de-energized state.

A dual gain solenoid fluid control valve is shown in FIG. 2. The dual gain solenoid fluid control valve 200 comprises a housing 202 containing a bobbin 204, and a coil of wire 206 wound on the bobbin 204 and connected to electrical terminals 208. An armature 210 moves in response to a current through the coil 206. The armature may be fixed to an actuator pin 212.

A valve member 214 is located within a piston 216, and seals an opening 218 in the piston 216 when the coil 206 is in the de-energized state. This state is shown in FIG. 2. An end of the spool 220 fits into an end of the piston 216 opposite the opening 218. A nozzle body 222 surrounds the spool 220 and the piston 216. The nozzle body 222 includes supply port 224 defined between O-ring seals 226 and 228 and protected by filter 230; control port 232 defined between O-ring seals 228 and 234 and protected by filter 236; and exhaust port 238. The spool 220 is moved to regulate pressure at the control port 232. A calibration cap 240 fits into the end of the nozzle body 222 opposite the armature 210. The calibration cap 240 may be tightened or loosened to change the force of the spring mechanism 242 on the spool 220.

In one embodiment of the invention, the spool 220 includes a radial spool bore 244 and longitudinal spool bore 246 that connect the supply port 224 to the piston chamber 248. The combined space in the longitudinal spool bore 246 and piston chamber 248 is referred to herein as the inner feedback chamber 246, 248. When the coil 206 is in the de-energized state, fluid from the supply port 224 fills the inner feedback chamber 246, 248 and exerts a first feedback force on the spool 220 that balances the force of the spring mechanism 242. The first feedback force depends on the supply pressure and the axial fluid contracting area of the inner feedback chamber 246, 248. In the de-energized state, the supply port 224 communicates to the control port 232, as shown in FIG. 2.

Figure 3:
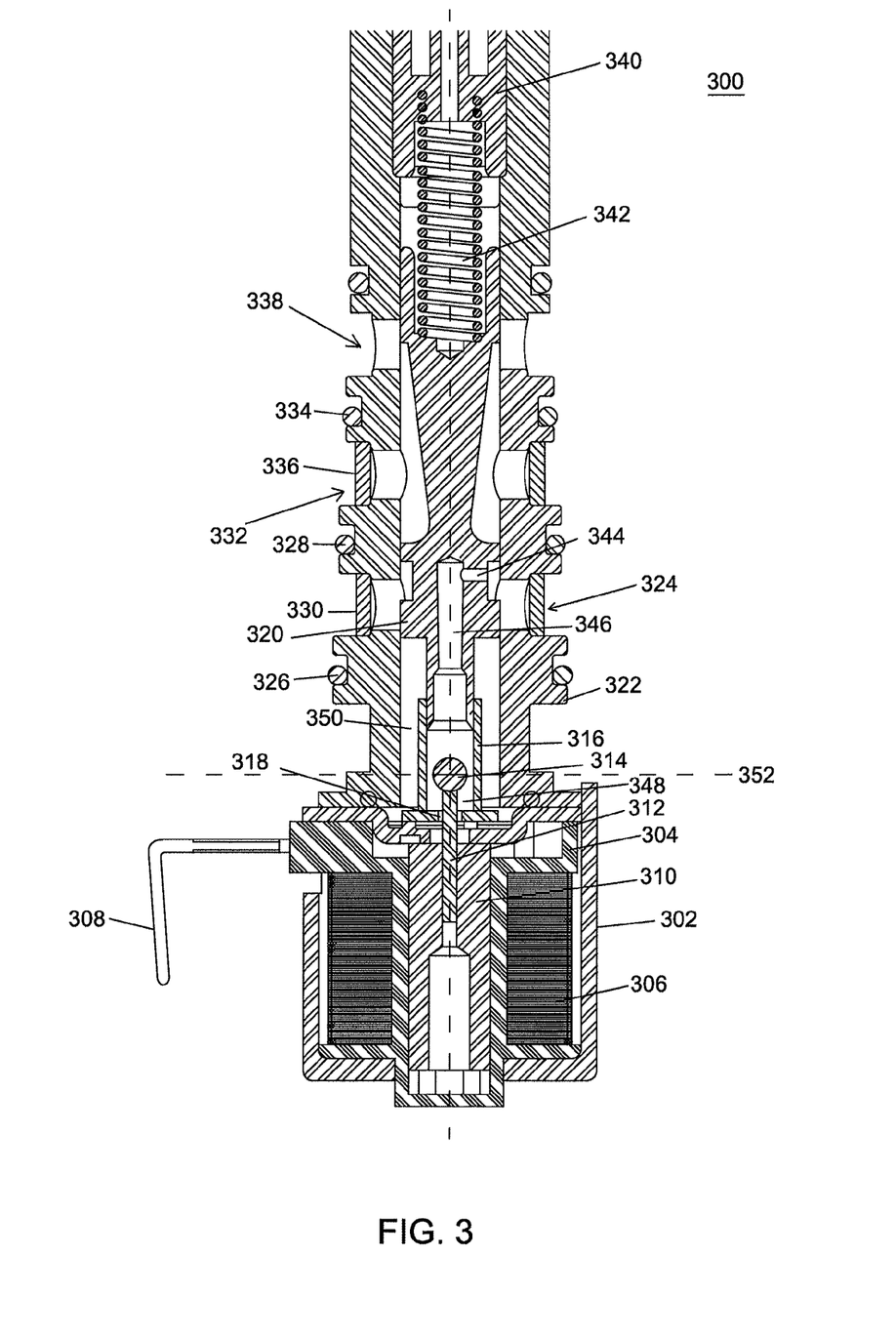
FIG. 3 shows the dual gain solenoid fluid control valve in an energized state.

FIG. 3 shows the solenoid fluid control valve 300 in the energized state, wherein like numbers in as in FIG. 2 correspond to like elements. When the coil 306 is energized, the armature 310 and pushpin 312 move axially, displacing the valve member 314 from the opening 318 in the piston 316. Fluid in the inner feedback chamber 346, 348 flows through the opening 318 and into the outer feedback chamber 350. Because the outer feedback chamber 350 increases considerably the contacting area that the fluid acts on in addition to the inner feedback area 346, 348, the fluid now exerts a much larger force on the spool 320. This force now exceeds the opposing force of the spring mechanism 342, and the spool 320 moves toward the spring mechanism 342, into the position shown in FIG. 3. In this state, the control port 332 communicates to the exhaust port 338, reducing the pressure at the control port (i.e., control pressure).

Figure 4:
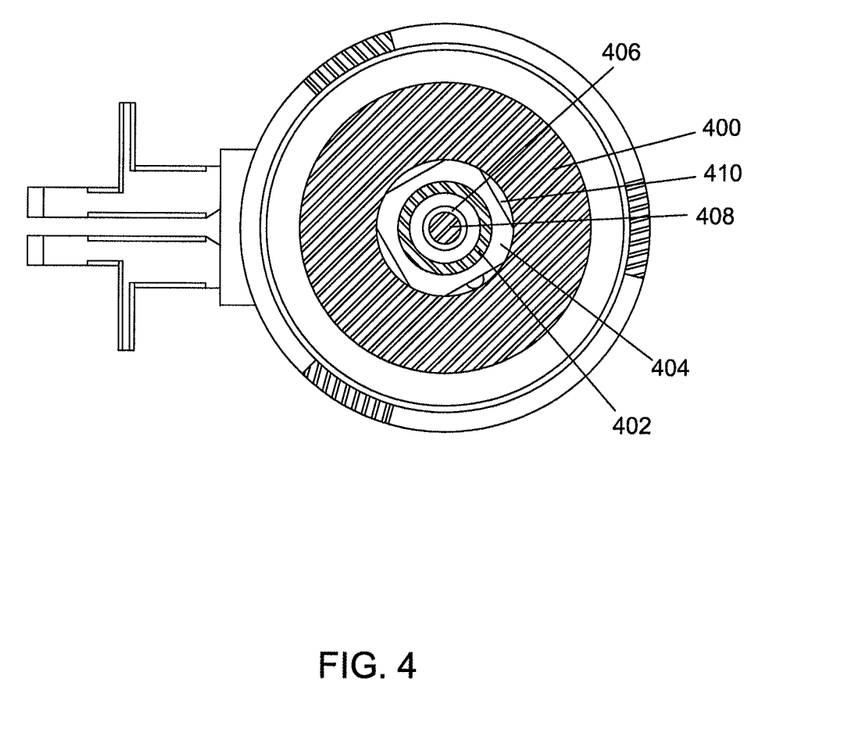
FIG. 4 illustrates a cross-section of the dual gain solenoid fluid control valve shown in FIG. 3.

FIG. 4 shows a cross-sectional view of the dual gain solenoid fluid control valve. The view is taken from the position of the dashed line 352 in FIG. 3, although the valve member 314 is not shown. Referring to FIG. 4, the nozzle body 400 surrounds the cylindrical piston wall 402, which is fixed to the rectangular piston base 404. A hole 406 in the piston base 404 is sufficiently wide to permit fluid to exit the inner feedback area while the pushpin 408 extends through the hole 406. The fluid passes under the piston base 404 and through the opening 410 between the rectangular piston base 404 and the cylindrical nozzle body 400, into the outer feedback chamber.

Figure 5:
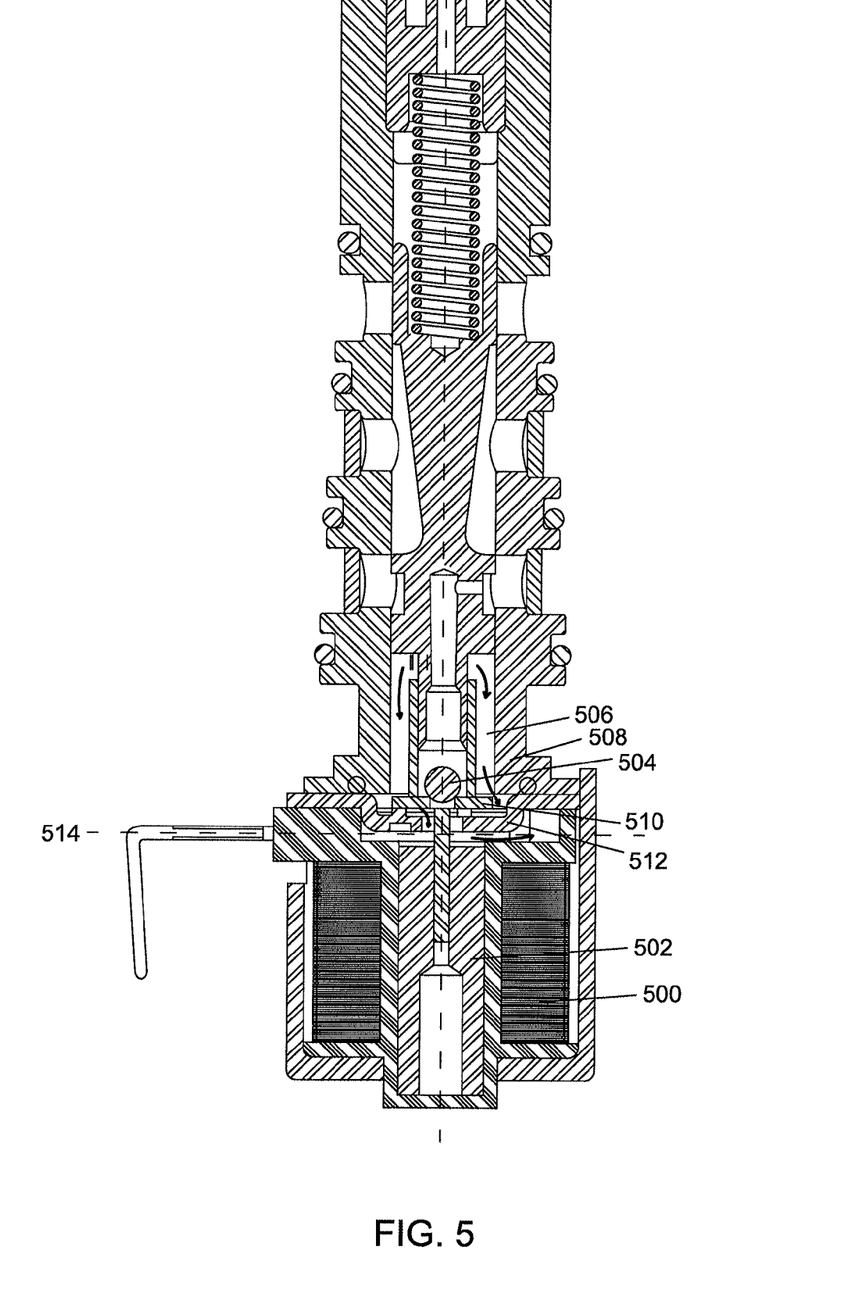
FIG. 5 shows an exhaust path for fluid in the outer feedback chamber.

Referring now to FIG. 5, when the coil 500 is returned to its de-energized state, fluid in the inner feedback chamber 516 and outer feedback chamber 506 exerts a force on the armature 502 and valve member 504, returning them to their initial position. Fluid from the outer feedback chamber 506 exits through an exhaust port (not shown). The fluid path is indicated by arrows. The fluid travels between the cylindrical nozzle body 508 and rectangular piston base 510. It then travels under the piston base 510 and through a hole in the washer 512.

Figure 6:
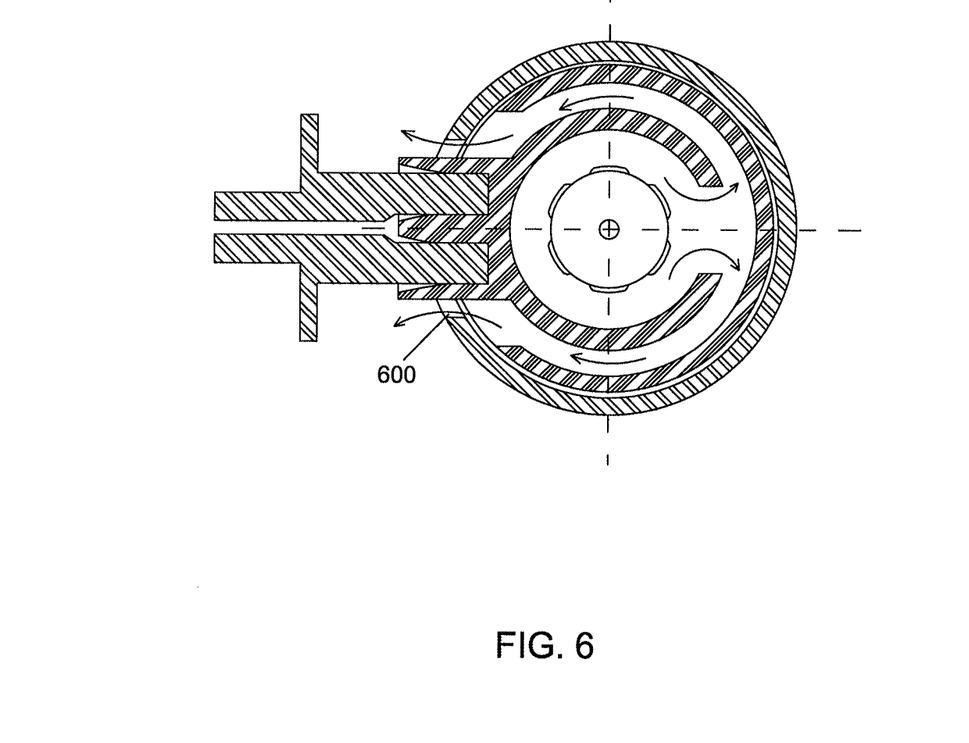
FIG. 6 shows a continuation of the exhaust path in a cross-section of the dual gain solenoid fluid control valve shown in FIG. 5.

FIG. 6 shows a cross-sectional view of the solenoid fluid control valve taken at the dashed line 514 in FIG. 5. As illustrated by the arrows in FIG. 6, fluid travels from an inner to an outer area between the washer and the bobbin and exits through an exhaust port 600. The departure of fluid from the outer feedback chamber reduces the pressure in that area, allowing the spool to return to its initial position.

Returning to FIG. 3, the dual gain solenoid fluid control valve 300 requires less force from the coil 306 than the direct acting solenoid fluid control valve of FIG. 1 requires. The force from the coil 306 is only required to displace the valve member 314 from the opening in 318 in the piston 316. Once the valve member 314 is displaced, fluid in the inner feedback chamber 346, 348 and outer feedback chamber 350 provides the force that displaces the spool 220 and compresses the spring mechanism 242.

In contrast, the force from the coil 106 in the direct acting solenoid fluid control valve 100 shown in FIG. 1 must be sufficient to displace the entire spool 112 and compress the spring mechanism 122. This greater force requires more turns of the coil 106, resulting in a larger, more expensive device. The dual gain solenoid fluid control valve utilizes the fluid pressure in the inner and outer feedback chambers to move the spool, thereby requiring fewer turns of the coil, and therefore allowing for a reduction in the device's size and cost.

The dual gain solenoid fluid control valve has a further advantage of improved robustness to contamination. Contamination can greatly affect the performance of a solenoid fluid control valve, as small contaminants in the fluid flowing through the valve may become lodged between moving and stationary elements, obstructing the smooth motion of the armature and spool. This obstruction may lead to hysteresis, as well as to variable responses to a given command current. Accordingly, the presence of contaminants may quickly degrade the solenoid fluid control valve's performance and reliability.

The first and second feedback chambers of the dual gain solenoid fluid control valve allow fluid to travel through wide passages within the device. The fluid may carry contaminants, but the wide chambers allow the valve to function without being inhibited by the contaminants. This increased robustness improves the reliability of the device, allowing for look-up tables to be created relating a current in the coil for a resulting control pressure. The lifetime of the device may also be extended as wear due to contaminants is minimized.

While the dual gain solenoid fluid control valve may be used as an on/off switch for the control pressure, a pulse width modulated (PWM) signal may be used to provide variations in the control pressure. The spring cap may be tightened or loosened to adjust the position of the spool in the energized and de-energized states. Once the two positions have been determined, the duty cycle of the PWM signal may determine how much time the solenoid spends in each state, thereby creating a variable control pressure.

Figure 7:
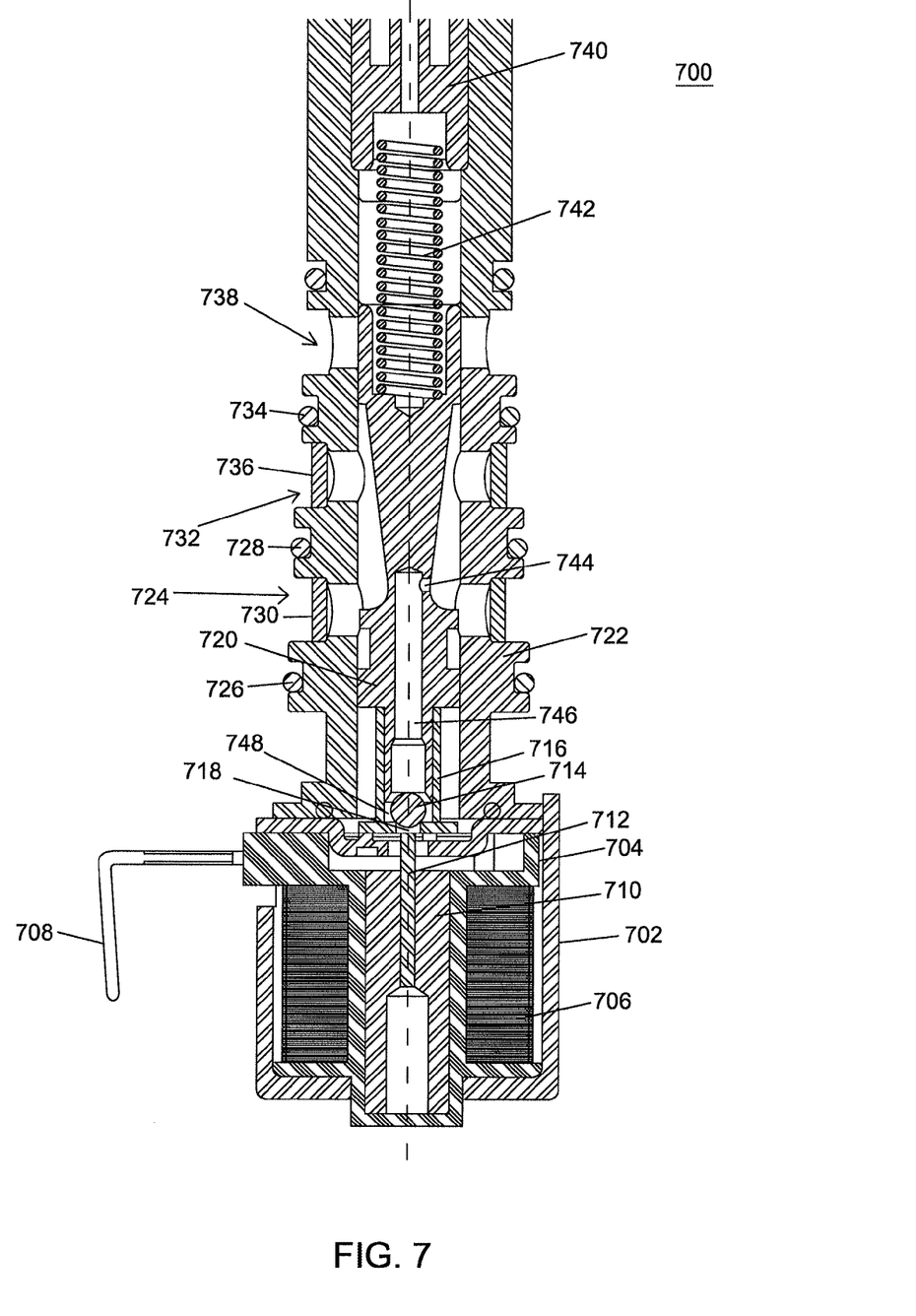
FIG. 7 shows a second embodiment of the dual gain solenoid fluid control valve in a de-energized state.
Figure 8:
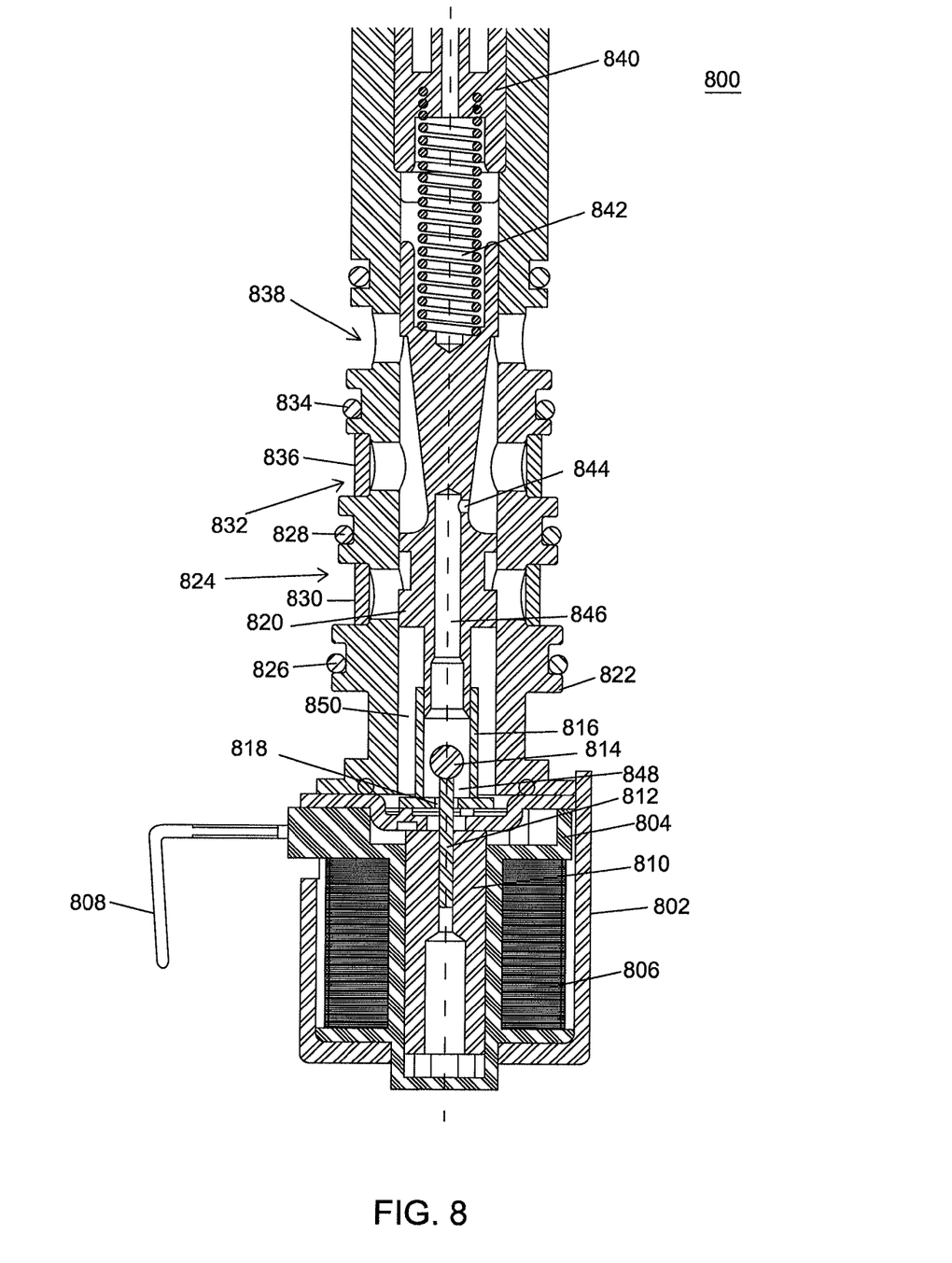
FIG. 8 shows the second embodiment of the dual gain solenoid fluid control valve in an energized state.

Another embodiment of the dual gain solenoid fluid control valve is shown in FIGS. 7 and 8, wherein like numbers as in FIGS. 2 and 3 indicate like elements. Referring to FIG. 7, the dual gain solenoid fluid control valve 700 is in the de-energized state. In this embodiment, the radial spool bore 744 is moved to a tapered region of the spool 720. In the de-energized state, the radial spool bore 744 is open to the supply port 724 and the control port 732.

Referring to FIG. 8, when the coil 806 is energized, the dual feedback from the inner feedback chamber 846, 848 and outer feedback chambers 850 moves the spool such that the radial spool bore 844 is open to the supply port 832 and the exhaust port 838. However, as in the first embodiment of the dual gain solenoid fluid control valve, the calibration cap 840 may be tightened or loosened to adjust the force of the spring mechanism 842 on the spool 820. This force in turn determines the position of the spool 820 when the coil 806 is in the de-energized and energized states. Accordingly, the spool position in the de-energized and energized states may not exactly correspond to the positions shown in FIGS. 7 and 8.

Referring to FIG. 8, the inner and outer feedback pressure now depends on both the supply and control pressures, and not just the supply pressure. Further, the placement of the radial spool bore 844 allows the device to be configured such that a small control pressure remains even when the coil 806 is energized, and the control pressure it at a minimum. Having a non-zero minimum control pressure allows the valve to be more responsive to a change in the current through the coil. This improved response allows the valve to be more accurately controlled by a PWM signal.

The dual gain solenoid fluid control valve may be used to control a variable displacement pump, wherein the valve's control pressure regulates the flow of fluid through the pump. The pump requires that the valve's response to a given command current be accurate and reliable, so that the command current may be correlated with a flow through the pump. The dual gain solenoid fluid control valve provides a reliable control pressure that is robust to contamination and responsive to small changes in the command current.

What is claimed is:
1. A solenoid fluid control valve comprising:
a fixed solenoid component;
a movable armature component;
a fixed nozzle body;
a movable spool within the fixed nozzle body; and
a valve member to regulate fluid pressure in a first and second feedback chamber;
wherein the fixed solenoid component includes a piston; and
wherein an end of the movable spool is moveable axially within an inner area of the piston.

2. The solenoid fluid control valve of claim 1 wherein a bore in the movable spool opens to the inner area of the piston to create the first feedback chamber.

3. The solenoid fluid control valve of claim 1, wherein a radial space between an inner surface of an end of the fixed nozzle body and an outer surface of the piston comprises the second feedback chamber.

4. The solenoid fluid control valve of claim 1, wherein the fixed nozzle body comprises at least one supply port, and wherein a bore in the movable spool allows fluid to flow from the at least one supply port to the first feedback chamber.

5. The solenoid fluid control valve of claim 4, wherein fluid pressures in the first and second feedback chambers are proportional to a pressure established at the supply port.

6. The solenoid fluid control valve of claim 1, wherein fluid in the first feedback chamber establishes a first feedback pressure.

7. The solenoid fluid control valve of claim 6, wherein the first feedback pressure acts on the movable spool with a motive feedback force in a first axial direction.

8. The solenoid fluid control valve of claim 7, wherein the motive feedback force is proportional to an axial fluid contacting area of the first feedback chamber.

9. The solenoid fluid control valve of claim 8, wherein the solenoid fluid control valve further comprises a spring mechanism, wherein the spring mechanism acts on the movable spool with a motive spring force in a second axial direction, and wherein the motive feedback force substantially balances the motive spring force.

10. The solenoid fluid control valve of claim 1, wherein the movable armature component is configured to displace the valve member to allow fluid to flow from the first feedback chamber to the second feedback chamber.

11. The solenoid fluid control valve of claim 1, wherein fluid in the second feedback chamber establishes a second feedback pressure.

12. The solenoid fluid control valve of claim 11, wherein the second feedback pressure acts on the movable spool with a motive feedback force in a first axial direction.

13. The solenoid fluid control valve of claim 12, wherein the motive feedback force is proportional to an axial fluid contacting area of the second feedback chamber.

14. The solenoid fluid control valve of claim 12, wherein the movable spool is configured to move in the first axial direction in response to the motive feedback force.

15. The solenoid fluid control valve of claim 14, wherein the fixed nozzle body has at least one control port, wherein a control pressure is established at the control port, and wherein the control pressure changes on a condition that the movable spool moves in the first axial direction.

16. The solenoid fluid control valve of claim 1, wherein the fixed nozzle body has at least one control port, and wherein a bore in the movable spool is configured to allow fluid to flow from the at least one control port to the first feedback chamber.

17. The solenoid fluid control valve of claim 16, wherein fluid pressures in the first and second feedback chambers are proportional to a pressure established at the control port.

18. The solenoid fluid control valve of claim 17 wherein an exhaust channel is configured to allow fluid to exit the second feedback chamber.

19. The solenoid fluid control valve of claim 1 wherein the solenoid fluid control valve is configured to control a fluid flow through a variable displacement pump.

* * * * *